(12) United States Patent
Aue et al.

(10) Patent No.: US 9,176,523 B2
(45) Date of Patent: Nov. 3, 2015

(54) ACTIVE FUNCTIONAL LIMITING OF A MICROCONTROLLER

(71) Applicants: Axel Aue, Korntal-Muenchingen (DE); Matthias Schreiber, Stuttgart-Feuerbach (DE)

(72) Inventors: Axel Aue, Korntal-Muenchingen (DE); Matthias Schreiber, Stuttgart-Feuerbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 228 days.

(21) Appl. No.: 13/914,264

(22) Filed: Jun. 10, 2013

(65) Prior Publication Data

US 2013/0332046 A1 Dec. 12, 2013

(30) Foreign Application Priority Data

Jun. 11, 2012 (DE) .................. 10 2012 209 712

(51) Int. Cl.
*G06F 1/06* (2006.01)
*F02D 41/26* (2006.01)
*G06F 13/12* (2006.01)
*G06F 21/00* (2013.01)
*G06F 21/74* (2013.01)
*F02D 41/28* (2006.01)

(52) U.S. Cl.
CPC *G06F 1/06* (2013.01); *F02D 41/26* (2013.01); *F02D 41/28* (2013.01); *G06F 13/12* (2013.01); *G06F 21/00* (2013.01); *G06F 21/74* (2013.01); *F02D 2041/286* (2013.01)

(58) Field of Classification Search
CPC ... F02D 41/26; F02D 2041/286; F02D 41/28; G06F 1/06
USPC ............ 701/101, 102, 115; 123/480; 713/501
See application file for complete search history.

(56) References Cited

U.S. PATENT DOCUMENTS

| | | | | |
|---|---|---|---|---|
| 6,141,774 | A * | 10/2000 | Mattheis | 714/27 |
| 6,415,390 | B1 * | 7/2002 | Manning | 713/501 |
| 6,453,425 | B1 * | 9/2002 | Hede et al. | 713/501 |
| 6,606,713 | B1 * | 8/2003 | Kubo | 713/501 |
| 6,877,102 | B2 * | 4/2005 | Chang et al. | 713/500 |
| 7,917,788 | B2 * | 3/2011 | May | 713/322 |
| 2004/0139362 | A1 * | 7/2004 | Inaba | 713/322 |
| 2008/0104434 | A1 * | 5/2008 | May | 713/322 |
| 2009/0240971 | A1 * | 9/2009 | Gupta et al. | 713/501 |
| 2012/0254658 | A1 * | 10/2012 | Tatsuno | 714/15 |

* cited by examiner

*Primary Examiner* — Mahmoud Gimie
(74) *Attorney, Agent, or Firm* — Kenyon & Kenyon LLP

(57) ABSTRACT

A microcontroller for use in a control device for an internal combustion engine includes: an analysis access via which internal data in the microcontroller can be accessed from outside the microcontroller; a clock generator which generates clock timing for data communication of the microcontroller with other units. The microcontroller is configured to change over from a first clock to a second clock when there is an access to the microcontroller via the analysis access.

13 Claims, 3 Drawing Sheets

ACTIVE FUNCTIONAL LIMITING OF A MICROCONTROLLER

BACKGROUND OF THE INVENTION

1. Field of the Invention

The present invention relates to a microcontroller for a control device for an internal combustion engine, to a control device for an internal combustion engine, to a method for the functional controlling of a microcontroller, and to a computer program for the functional limiting of a microcontroller.

2. Description of the Related Art

The task of an engine control device of an internal combustion engine is to calculate output quantities for actuating elements (such as injection nozzles or an ignition system) from a multiplicity of input signals (such as rotational speed, temperature, or pressure). For this purpose, a control device has a microcontroller having its own storage device (so-called on-chip storage), in which the data, characteristic maps, and/or programs required for the calculation—also generally referred to below as internal data—are stored.

During the manufacturing of the control device, particular storage regions are written to by the manufacturer of the control device, standardly a supplier company, with programs (firmware), data, and/or characteristic maps. The control device written to in this way is supplied to the vehicle manufacturer, who may make further changes to the data and characteristic maps in order to optimally calibrate the control device to the internal combustion engine. The data, characteristic maps, and/or programs are specified, on the basis of intensive research and testing, in such a way that the internal combustion engine operates so as to protect components and the environment to the greatest possible extent. In particular, the internal data are specified in such a way that even in extreme conditions no damage to the internal combustion engine will occur. Through corresponding reprogramming (so-called chip tuning) of the microcontroller in the control device, therefore, more or less large increases in efficiency are possible.

A manipulation of internal data of the microcontroller can thus result in changed vehicle behavior.

For the purposes of development and analysis, it is necessary that access remain possible to such internal data. For example, the access permits an error analysis in the case of device failure, and takes place via an analysis access of the microcontroller.

If, however, via the analysis access internal data of the microcontroller are read out and changed by an unauthorized person, vehicle manufacturers or suppliers can no longer predict the behavior of the vehicle. Correspondingly, a customer cannot be given product guarantees if the data have been manipulated.

It is desirable to prevent unauthorized access to a microcontroller, and thus to increase operational reliability.

BRIEF SUMMARY OF THE INVENTION

According to the present invention, a microcontroller, a method, a computer program, and a computer-readable medium are provided. The microcontroller according to the present invention is suitable for use in a control device for an internal combustion engine, such as a motor vehicle. The microcontroller has an analysis access via which internal data in the microcontroller can be accessed from outside the microcontroller (and which can at the same time be a debug access). The internal data can for example include information about stored software that also determines the manner of functioning of the microcontroller. The microcontroller has clock generating means that generate the clock for a data communication of the microcontroller with other units.

The microcontroller according to the present invention is configured so as to change over from a first clock to a second, in particular less precise, clock for the data communication if the microcontroller is accessed, or has been accessed, via the analysis access. Via the clock, preferably actions of the microcontroller and/or its communication are outwardly coordinated. The precision is expressed in particular as a frequency consistency or regularity of the clock.

The method according to the present invention is used for the functional limiting of a microcontroller. It includes a detection of an access to the microcontroller and a changeover from a first to a second clock of the microcontroller.

The second clock is in particular selected such that while it does continue to permit a data communication between the microcontroller and an external access device via the analysis access, it is however too imprecise for a bus communication. The control device can then still be read out and/or written to, but can no longer control the internal combustion engine.

The microcontroller according to the present invention and the method according to the present invention thus permit a read or write access to internal data in the microcontroller from the outside, even after the provision and use of this microcontroller, for example in a motor vehicle. With these data, for example field returns can be analyzed. The changeover of the clock caused by an access therefore enables a determination of a previous access to the microcontroller. In this way, a manipulation of the microcontroller can be detected, and/or a use of the microcontroller after an access to the data can be made impossible. In particular, warranty claims that may be raised can be rejected, and/or the safety of a vehicle can be increased.

In a particularly preferred specific embodiment, the changeover of the clock is irreversible. An access to the microcontroller thus cannot be retroactively made unrecognizable. An unauthorized use of the manipulated microcontroller is thus not only made more difficult, but can be made impossible. The changeover can for example be realized by the irrevocable setting of a marker.

In a preferred specific embodiment, the first clock is a highly precise clock. This can for example be generated with an internal phase-locked loop (PLL) and external quartz crystal. Such a highly precise clock is suitable in particular if the microcontroller is used in a control device, or is to be used in a control device, whose communication with one or more other control device(s) of an internal combustion engine takes place via a corresponding interface, such as interfaces for a FlexRay field bus system, a CAN bus, or some other communication system.

The second clock is preferably less precise than the first. Preferably, the precision of the clock generation in the case of the second clock is reduced far enough that, given a use of the microcontroller in a control device, communication is no longer possible between the control device and another control unit of the internal combustion engine. For example, the second clock can be selected such that, in contrast to the first clock, it is too imprecise to permit the use of a suitable bus system (such as a FlexRay field bus system or a CAN bus). In this way, the use of the microcontroller after an access to the internal data thereof in an internal combustion engine can be prevented. The second clock can for example be generated by an uncalibrated internal RC oscillator, or by a pseudorandom clock generator.

Further advantages and embodiments of the present invention result from the description and the accompanying drawing.

Of course, the features named above, and those explained below, may be used not only in the combination indicated in each case, but also in other combinations or by themselves, without departing from the scope of the present invention.

The present invention is presented schematically in the drawings on the basis of exemplary embodiments, and in the following is described in detail with reference to the drawings.

DETAILED DESCRIPTION OF THE INVENTION

Figure 1A:
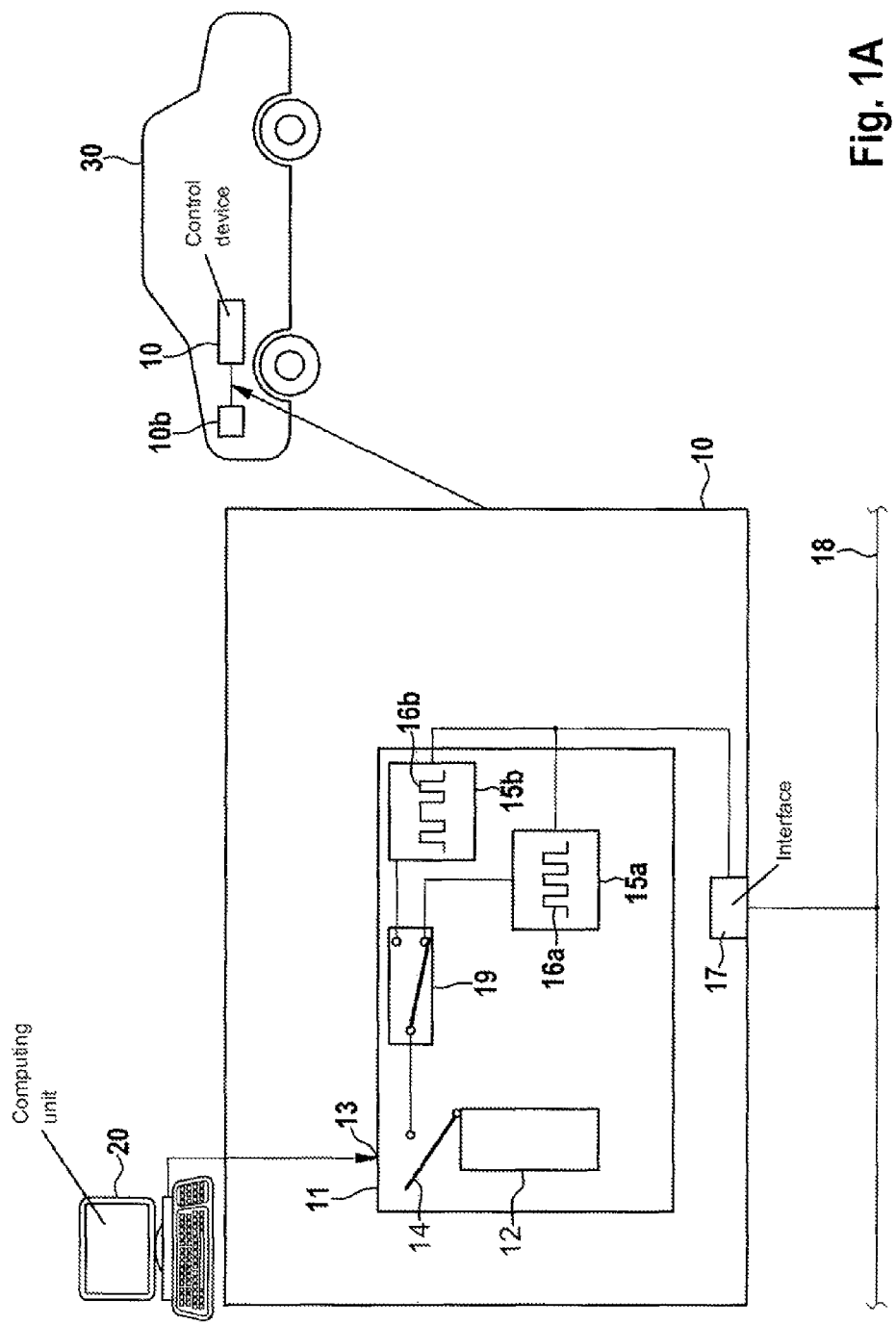
FIGS. 1A and 1B show a specific embodiment of the microcontroller according to the present invention in a respective state, and incorporated into a control device.
Figure 1B:
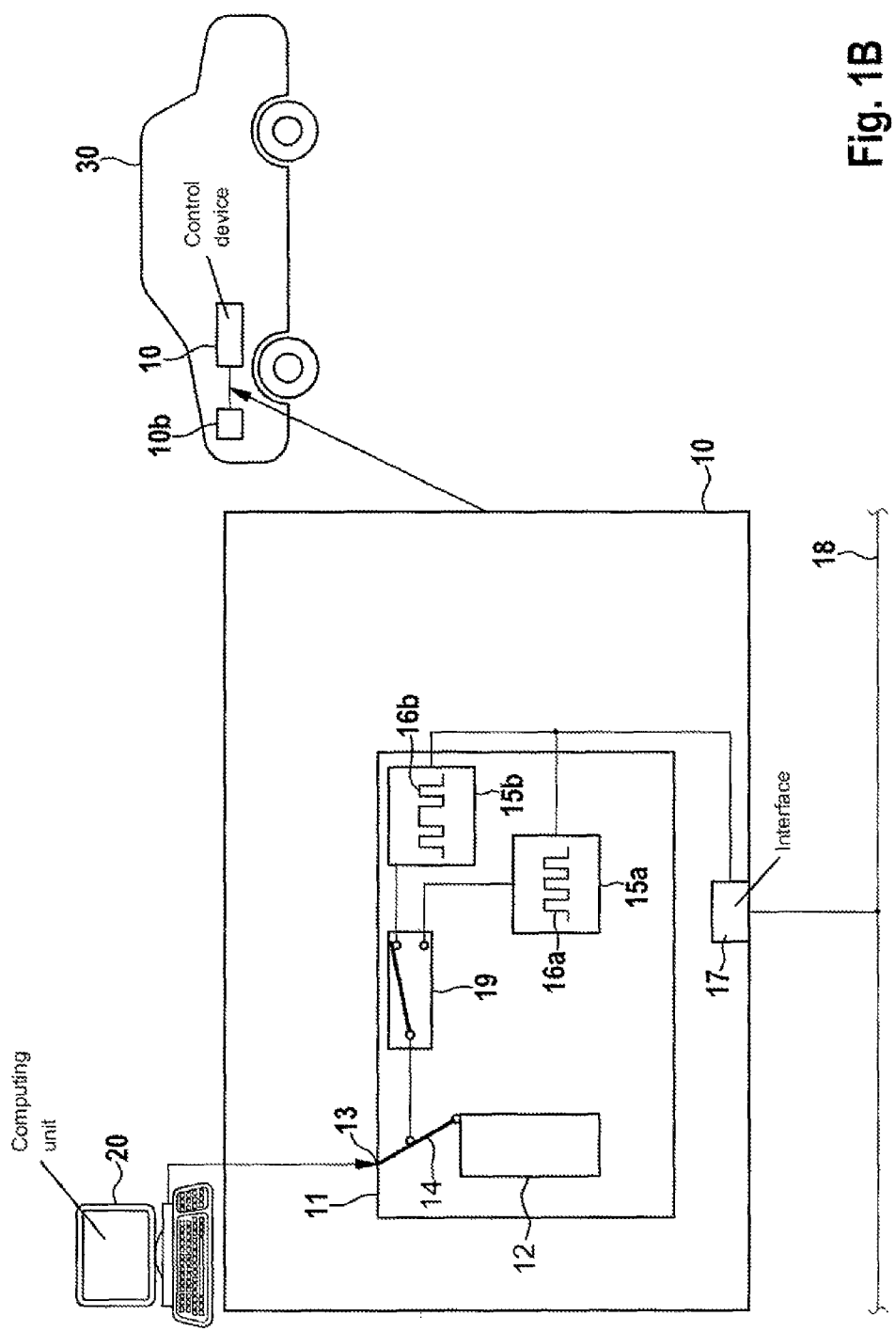

FIGS. 1A and 1B show a microcontroller 11 that is used in a control device 10 for a motor vehicle 30. The microcontroller has an internal memory device 12 and an analysis access 13 (which can at the same time be a debug access). The possibility of opening and closing the analysis access is shown symbolically in FIGS. 1A and 1B by switch 14. In FIG. 1A the access is closed, and in FIG. 1B it is open. When analysis access 13 is open, an external computing unit 20 can access internal data in memory 12.

Depicted microcontroller 11 has, as clock generating means, units 15a and 15b for clock generation. Unit 15a generates a first clock 16a, and unit 15b generates a second clock 16b. Unit 15a can for example be an internal phase-locked loop in connection with an external quartz crystal, and unit 15b can be for example an uncalibrated internal RC oscillator or a pseudorandom clock generator.

Both units are connected to an interface 17 of the control device. Via interface 17, control device 10 is connected to a bus system 18 that is provided for a communication with one or more other control units in vehicle 30. The units for clock generation influence this communication.

Which of units 15a and 15b is used for clock generation is determined according to marker 19, which in FIGS. 1A and 1B is also symbolically represented by a switch. The marker reflects whether analysis access 13 is, or was, open or not.

For example, the access to the interior of the microcontroller can be protected by a password. The microcontroller can be configured in such a way that the marker is irrevocably set after the correct password is entered.

FIG. 1A represents the case in which the analysis access is closed, for which reason no marker was set. According to the present invention, therefore, the first clock is generated. The switch position of marker 19 correspondingly symbolizes an activation of clock generator 15a.

In contrast, FIG. 1B the position of switch 14 symbolizes that analysis access 13 is open, and computing unit 20 can access the internal data in memory unit 12. Through the opening, marker 19 is set, which brings about an activation of second clock generator 15b and a deactivation of clock generator 15a. Preferably, the second clock is too imprecise to be able to fulfill the specifications of the protocol used by the bus system. A communication of control device 10 with another control unit is then no longer possible.

Figure 2:
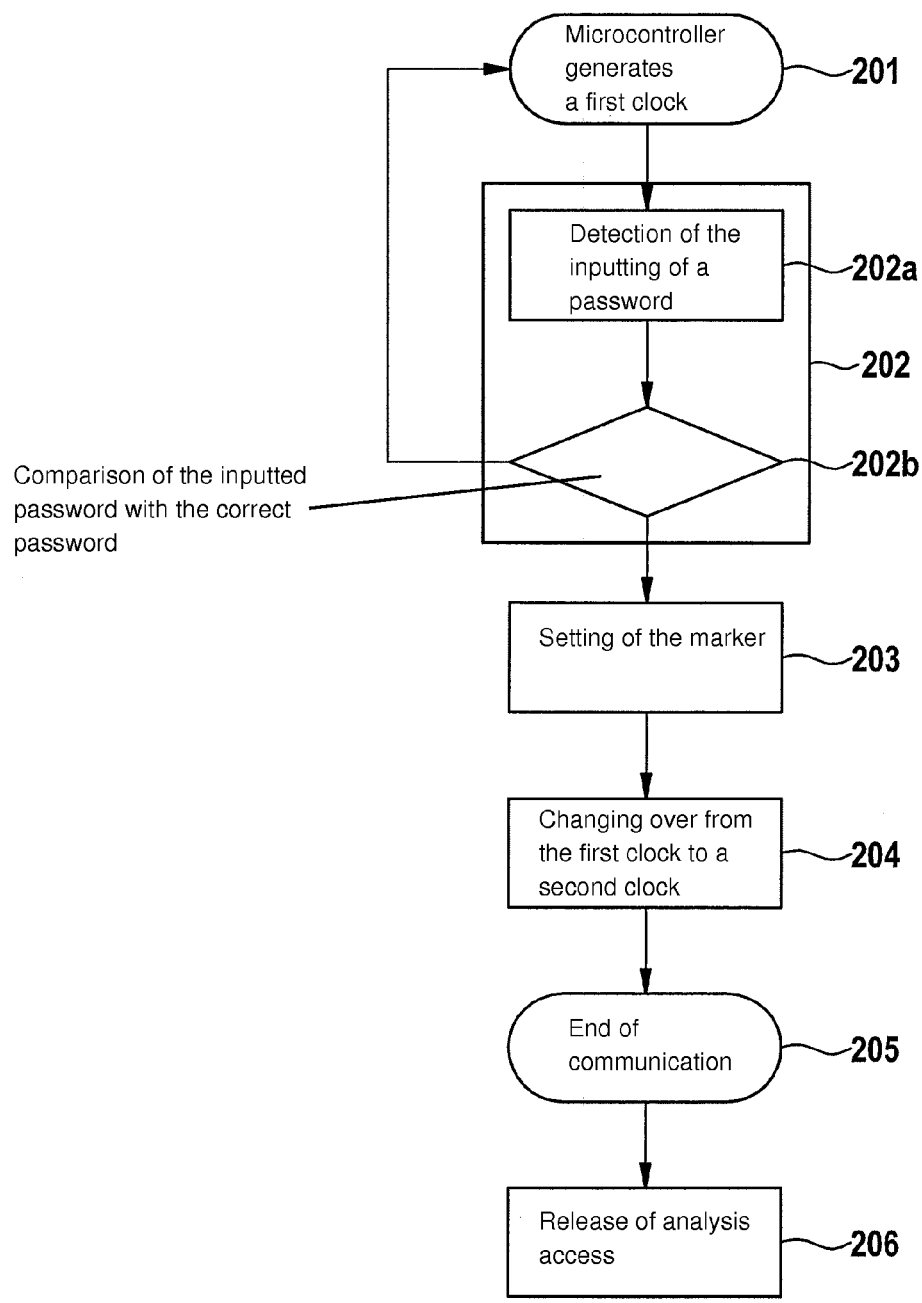
FIG. 2 shows a flow diagram for a specific embodiment of the method according to the present invention.

FIG. 2 is a diagram showing steps of a specific embodiment of the method according to the present invention. In a preliminary step complex 201, microcontroller 11 is used in a control device that is incorporated into an internal combustion engine, such as a vehicle. The microcontroller here generates a first clock that is preferably highly precise. The analysis access is here locked with a password. Step complex 201 can in addition include a connection of the microcontroller to a computing unit 20, and/or can include waiting for the attempt to access internal data of the microcontroller.

In step 202, an attempt to access internal data of the microcontroller via the analysis access thereof is detected. This includes detection 202a of the inputting of a password, and a comparison 202b of the inputted password with the correct password. If the inputted password does not agree with the correct one, the method jumps back to step 201. If, in contrast, the two passwords are identical, in step 203 a marker 19 is irrevocably set. In this way, a step 204 of changing over from the first clock to a second clock is brought about. As stated above, the second clock is preferably imprecise enough that a communication of the control device via the interface being used becomes impossible. Step 205 symbolizes the end of the communication. Finally, in step 206 the analysis access is released. Data read out from the microcontroller can now be used for error analyses or other purposes of analysis. However, the microcontroller can no longer be used.

What is claimed is:

1. A microcontroller for a control device of an internal combustion engine, comprising:
   an analysis access; and
   at least one clock generating unit which generates at least one clock for data communication of the microcontroller with other units;
   wherein the microcontroller is configured to, whenever internal data in the microcontroller is accessed from the outside via the analysis access, respond to the access by changing over from a first clock to a second clock which differs from the first clock.

2. The microcontroller as recited in claim 1, wherein at least one of:
   the first clock is a highly precise clock generated with an external quartz crystal and internal phase-locked loop; and
   the second clock is less precise than the first clock, the second clock being generated as a result of a changeover to one of an uncalibrated internal RC oscillator or a pseudorandom clock generator.

3. The microcontroller as recited in claim 2, wherein:
   when an access to the microcontroller via the analysis access occurs, a marker is irrevocably set in the microcontroller and causes the changeover to the second clock.

4. The microcontroller as recited in claim 3, wherein the access to the microcontroller via the analysis access is protected by a password, and wherein an inputting of the password causes the setting of the marker.

5. The microcontroller as recited in claim 3, wherein the second clock prevents a communication between the control device and another unit in the internal combustion engine.

6. The microcontroller as recited in claim 1, wherein the data access includes a read access of the internal data in the microcontroller from the outside, and the read out data is used for an analysis.

7. The microcontroller as recited in claim 1, wherein the internal data includes at least one of characteristic maps and programs used by the microcontroller to calculate output quantities for actuating elements.

8. A control device for an internal combustion engine, comprising:

a microcontroller including:

an analysis access; and at least one clock generating unit which generates at least one clock for data communication of the microcontroller with other units, wherein the microcontroller is configured to, whenever internal data in the microcontroller is accessed from the outside via the analysis access, respond to the access by changing over from a first clock to a second clock which differs from the first clock; and an interface to a field bus system via which the control device communicates with another unit in the internal combustion engine, wherein the field bus system is a FlexRay bus system or a CAN bus system.

9. A method for controlling an operation of a microcontroller that is configured to, whenever internal data in the microcontroller is accessed from the outside, respond to the access by performing a clock switching, the method comprising:

automatically detecting an access to the microcontroller; and responsive to the detection, performing the clock switching, wherein the clock switching includes automatically switching from (i) a first clock for data communication of the microcontroller with other units, the first clock being generated by a first clock generating unit, to (ii) a second clock generated by a second clock generating unit, the second clock being different from the first clock, wherein the first clock is more precise than the second clock.

10. The method as recited in claim 9, wherein at least one of (i) the first clock is generated using an external quartz crystal and internal phase-locked loop, and (ii) the second clock is generated by an uncalibrated internal RC oscillator or a pseudorandom clock generator.

11. The method as recited in claim 10, further comprising:

setting an irrevocable marker to cause the switching from the first clock to the second clock.

12. The method as recited in claim 11, wherein the detection of an access to the microcontroller includes a detection of an inputted password and a comparison of the inputted password with a correct password.

13. A non-transitory computer-readable data storage medium storing a computer program having program codes which, when executed on a computer, performs a method for controlling an operation of a microcontroller, the method comprising:

automatically detecting an access to the microcontroller; and automatically switching from (i) a first clock for data communication of the microcontroller with other units, the first clock being generated by a first clock generating unit, to (ii) a second clock generated by a second clock generating unit, the second clock being different from the first clock, wherein the first clock is a highly precise clock and the program provides for the switching to occur responsive to, and whenever, internal data in the microcontroller is accessed from the outside.

* * * * *